R. P. STOUT & F. A. SULLIVAN.
GUN SIGHT.
APPLICATION FILED JULY 31, 1912.
1,106,747.
Patented Aug. 11, 1914.
6 SHEETS—SHEET 6.
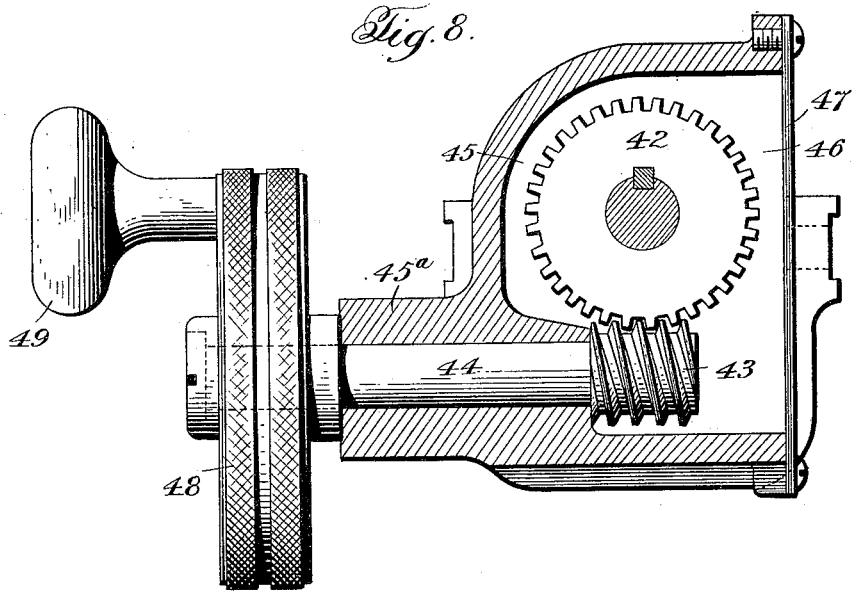
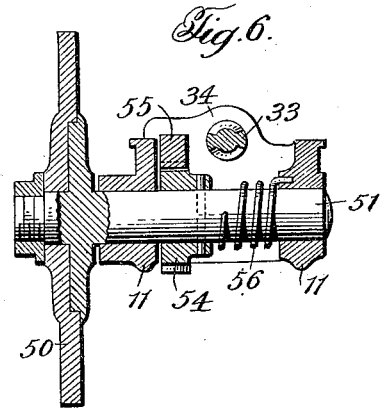
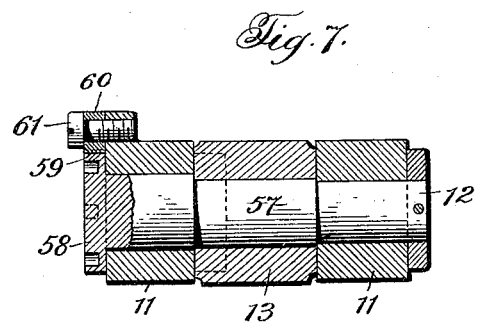

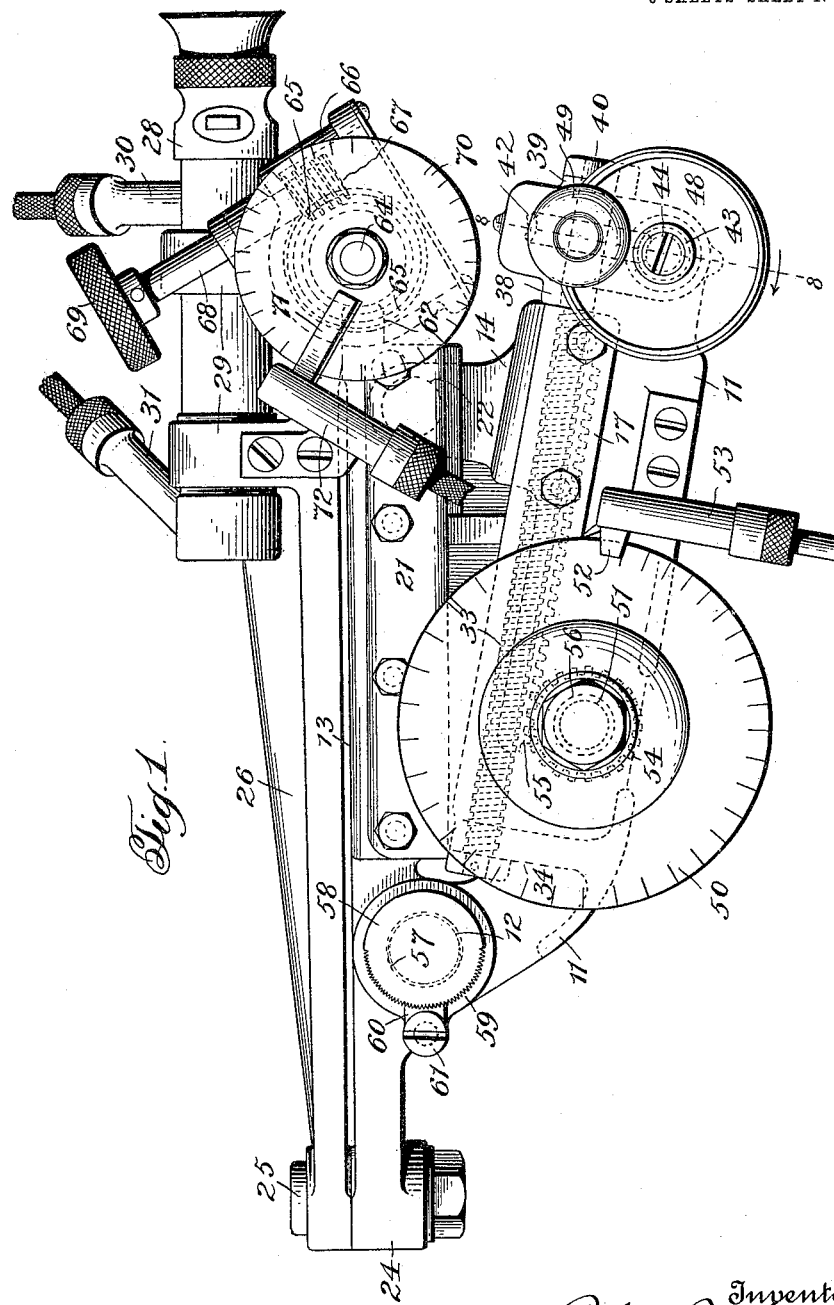
R. P. STOUT & F. A. SULLIVAN.
GUN SIGHT.
APPLICATION FILED JULY 31, 1912.
1,106,747.    Patented Aug. 11, 1914.
6 SHEETS—SHEET 1.

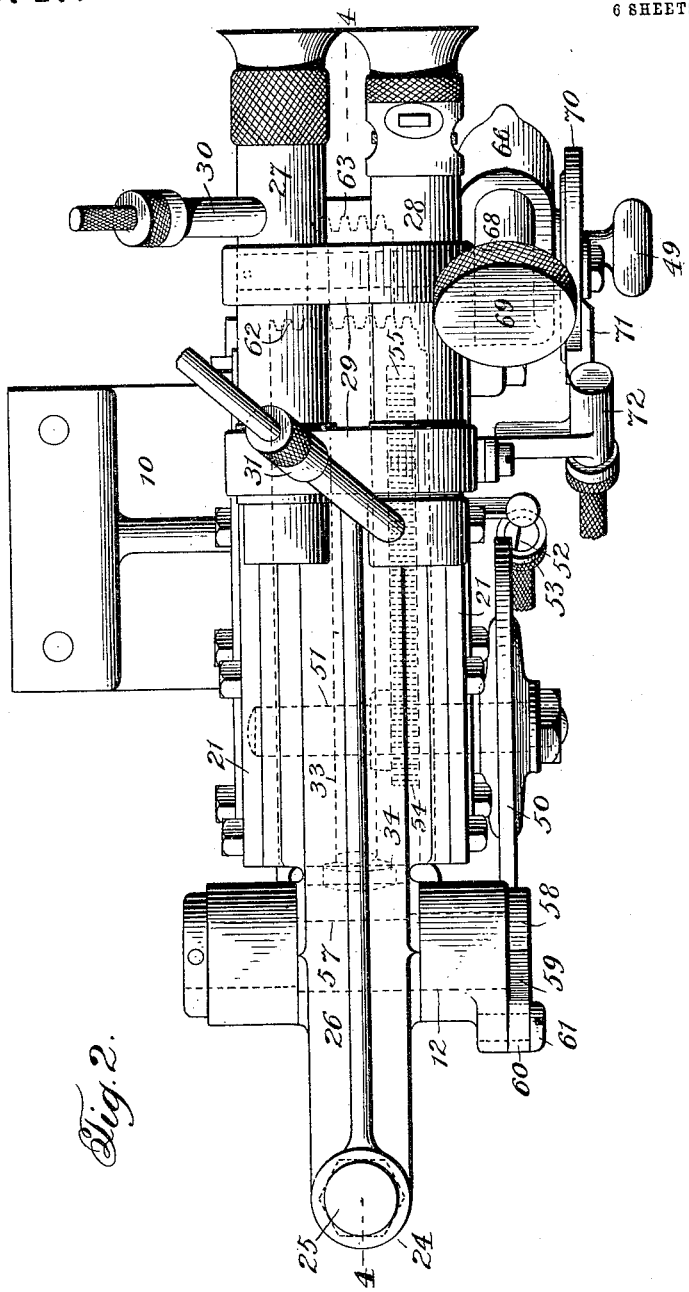

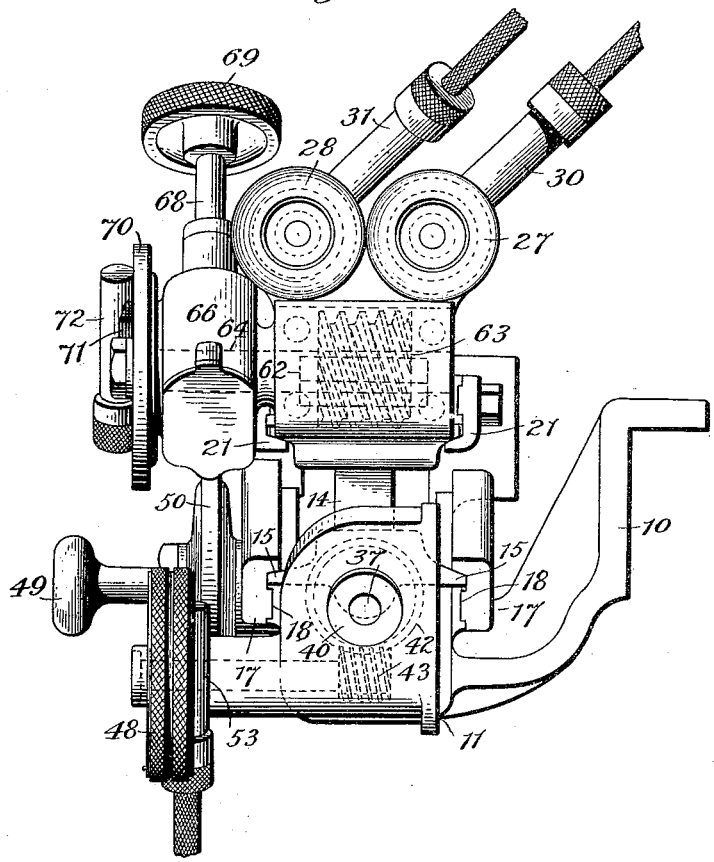

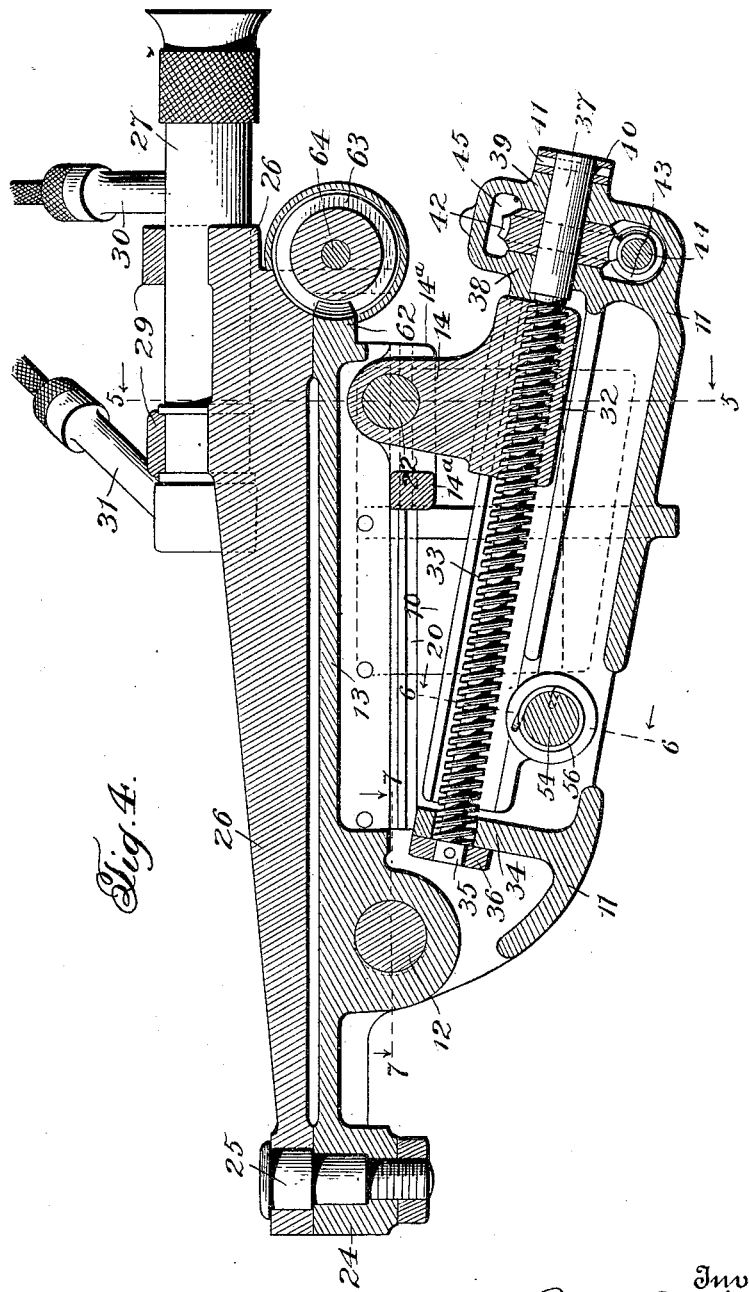

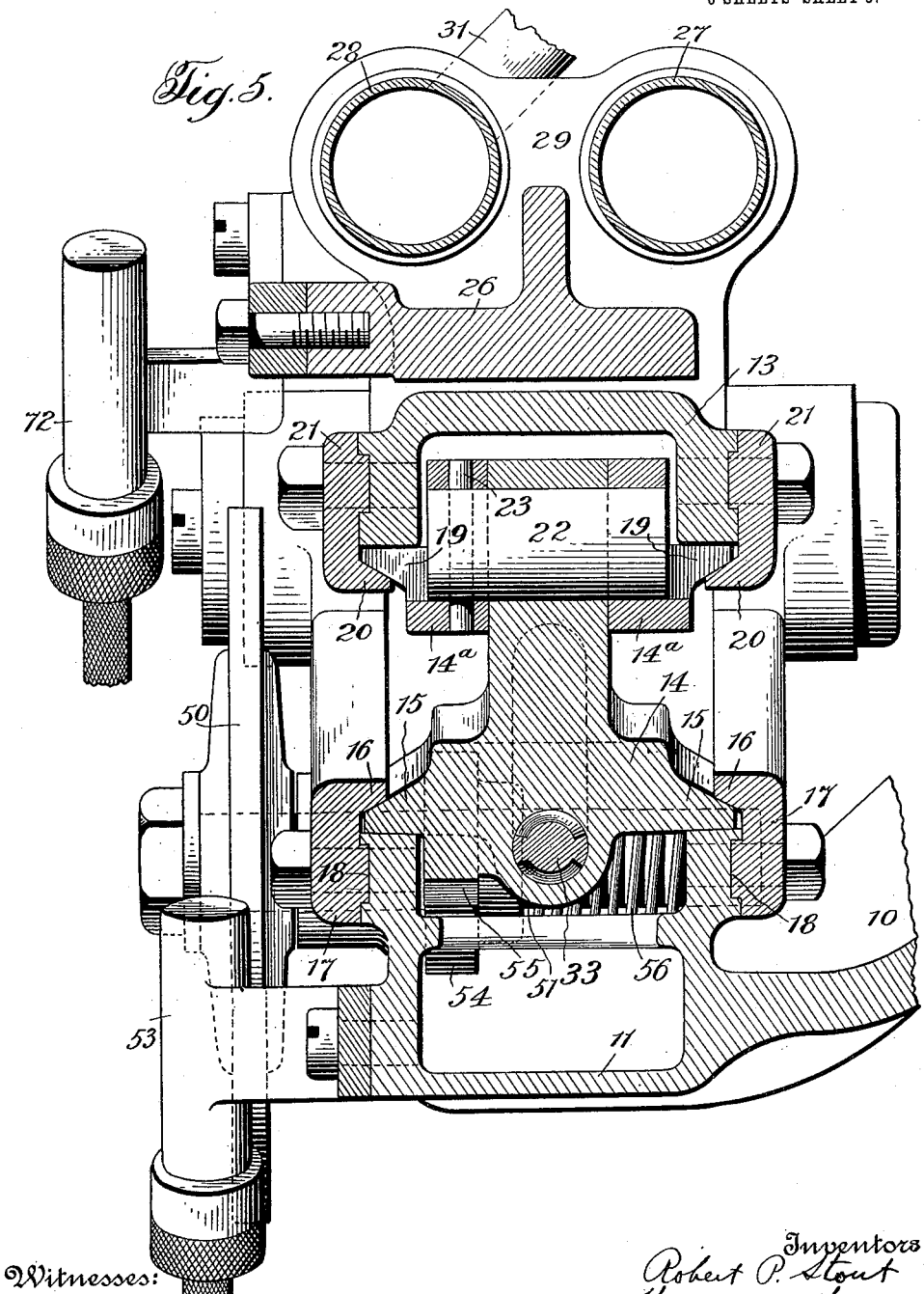

UNITED STATES PATENT OFFICE.

ROBERT P. STOUT AND FRANK A. SULLIVAN, OF BETHLEHEM, PENNSYLVANIA, ASSIGNORS TO BETHLEHEM STEEL COMPANY, OF SOUTH BETHLEHEM, PENNSYLVANIA, A CORPORATION OF PENNSYLVANIA.

GUN-SIGHT.

1,106,747.   Specification of Letters Patent.   Patented Aug. 11, 1914.

Application filed July 31, 1912. Serial No. 712,580.

*To all whom it may concern:*

Be it known that we, ROBERT P. STOUT and FRANK A. SULLIVAN, citizens of the United States, and residents of Bethlehem, Northampton county, Pennsylvania, have invented certain new and useful Improvements in Gun-Sights, of which the following is a specification.

This invention relates to sighting devices for use in connection with guns. As ordinarily constructed such devices include a range dial whereon are indicated the various distances within the range of the gun. It is a well known fact that the angle of elevation of a gun does not vary in any direct relation to the range. For example, it has been found that for a certain type of gun the variation in the angle of elevation in order to increase the range from 100 meters to 200 meters is 2'—20", and the change in elevation of the gun for the difference in range between 3000 meters and 3100 meters is 5'—14", and the change in elevation of the gun for the increase in range from 6000 meters to 6100 meters is 12'—26", and between 9100 meters and 9200 meters the difference in elevation is 23'—23". From the above it will be apparent that if the range dial is moved in direct relation to the change of elevation, the angular distance on the dial between the lines indicating 100 meters and 200 meters range and the angular distance between the lines indicating 9000 meters and 9100 meters range will be different, being comparatively very much smaller at the short range than at the long range. Since it is only practicable to use a range dial of comparatively small diameter this difference in the spacing between the lines indicating the same increments in range for different lengths of range necessitates the use of very fine spacings for short range and comparatively wide spacings for long range. The short spacings tend more or less to inaccuracy owing to the fact that a very slight change makes a considerable change in the range.

One of the objects of this invention is to provide a gun sight in which the relation of the movement of the range dial to the change in elevation of the gun is such that the spacings on the range dial may be more nearly uniform. Mechanisms to accomplish this result have been devised but none of these mechanisms provides spacings on the range dial which are as uniform as is desired.

By the present invention we have produced a gun sight in which the spacings on the range dial are substantially uniform so that the degree of accuracy at short ranges is approximately equal to that at the longer ranges.

Another object of the invention is to produce a gun sight which is simple in construction and so arranged that the wear on the moving parts may be compensated for and thereby maintain its greatest accuracy indefinitely.

Other objects and the features of novelty will be apparent from the following description taken in connection with the accompanying drawings, in which:

Figure 1 is a side elevation of the gun sight; Fig. 2 is a plan view, and Fig. 3 is a rear elevation of the same; Fig. 4 is a longitudinal section on the line 4—4 of Fig. 2; Fig. 5 is a section on the line 5—5 of Fig. 4; Fig. 6 is a section on the line 6—6 of Fig. 4; Fig. 7 is a section on the line 7—7 of Fig. 4; and Fig. 8 is a section on the line 8—8 of Fig. 1.

Referring to the drawings, 10 indicates a bracket which may be secured to the cradle or slide of a gun (not shown) this bracket supporting the movable parts of the sight and carrying the operating parts. The bracket 10 comprises the body portion 11 having at its forward end a pivot 12 by means of which the table 13 is pivoted to the bracket. The body portion 11 of the bracket has slidably arranged thereon the block 14, this block being provided with V-shaped flanges 15 which are arranged between the upper edge of the body portion 11 of the bracket and the flanges 16 carried by side plates 17 which are secured to the body portion 11. The side plates 17 may be provided with tongues or ribs 18 which engage corresponding grooves in the sides of the body portion whereby the plates are securely and accurately held in position. The table 13 has slidably arranged on the under side thereof a block 14ᵃ, this block being provided with V-shaped flanges 19 which are arranged between the table and the flanges 20 on the plates 21, these plates being secured to the table. This construction is similar to the arrangement of the block 14 on the body portion 11 of the bracket. The blocks 14 and 14ᵃ are pivotally connected together by means of the pin 22, this pin being preferably secured to the block 14ᵃ by a suitable cotter 23.

Since the table 13 is pivoted to the body portion 11 of the bracket and the blocks 14 and 14ᵃ are pivotally connected together and slide respectively on the body portion 11 and the table 13, it will be seen that the blocks 14 and 14ᵃ together constitute a wedge by means of which the angular relation of the table 13 to the body portion 11 of the bracket may be varied by moving the blocks toward or away from the pivot 12. The table 13 has a forwardly extending arm 24 which carries a vertical pivot pin 25 by means of which a support 26 is pivoted to the table 13. The support 26 has arranged thereon the telescopes 27 and 28, these telescopes being held in position by the yokes 29 which may be secured to the support 26 in any suitable manner. The telescopes 27 and 28 may be of any suitable construction and may be provided with the usual electric lamps 30 and 31. The telescope 27 is preferably a dumb telescope or peep sight.

For the purpose of moving the blocks 14 and 14ᵃ toward and away from the pivot 12 the block 14 may be provided with an internally threaded boss 32 which is engaged by a screw 33, the forward end of this screw being mounted in a suitable bearing 34 carried by the body portion 11 of the bracket, and may have its forward end reduced in diameter, as at 35, to receive a collar 36, by means of which the screw is held in position. By this construction the rotation of the screw will move the blocks 14 and 14ᵃ, and in order to rotate the screw any suitable rotating mechanism may be provided. For this purpose we have shown the screw as being provided with a rearward extension 37 which is arranged in bearings 38 and 39 carried by the body portion 11 of the bracket. A collar 40 may be secured to the extension 37 by means of a pin 41 and bearing against the outer end of the bearing 39 will coöperate with the collar 36 at the forward end of the screw to prevent the latter from moving longitudinally. A worm-wheel 42 may be arranged on the extension 37 between the bearings 38 and 39, and a worm 43 on the shaft 44 may be arranged in engagement with the lower side of the worm-wheel 42 for the purpose of rotating the latter. The worm-wheel 42 and the worm 43 may be arranged in a suitable pocket 45 formed in the body portion 11 of the bracket, this pocket having an open side 46 which may be provided with a suitable closure 47. The shaft 44 is arranged in the bearing 45ᵃ and projects beyond the outer end of the bearing and has mounted thereon an operating wheel 48, which may be provided with an operating handle 49.

A range dial 50 is provided at the side of the body portion 11 of the bracket and is supported on a suitable shaft 51 carried by the body portion. An index 52 may be arranged at the circumference of the dial 50 and secured to the body portion 11 of the bracket, and an electric lamp 53 may be provided for the purpose of lighting the index so that the dial may be read at night. The shaft 51 has arranged thereon a pinion 54 which meshes with a rack 55 carried by the block 14, this rack being arranged parallel with the screw 33 so that as the block 14 is moved the pinion 54 and the shaft 51 and range dial 50 will be rotated. The arrangement of these parts is preferably such that the range dial will make almost one complete revolution for the full range of movement of the block 14. In order to eliminate inaccuracies which might result from backlash or wear between the pinion 54 and the rack 55, a spring 56 may be provided, this spring having one end secured to the shaft 51 and the other end secured to the body portion 11 of the bracket and so arranged as to always hold the teeth of the pinion 54 against the same surface of the rack teeth.

In order to provide for any inaccuracies in manufacture which might result in errors in the readings of the range dial the pivot pin 12 is provided with the eccentric portion 57 which engages the table 13. At one end the pivot pin 12 may be provided with a head 58 having very fine teeth 59 on its circumference. In order to lock the pin 12 in position a small plate 60 may be secured to the body portion 11 of the bracket by means of a screw or bolt 61, this plate having teeth which engage the teeth on the head 58. It will be readily understood that this construction permits the pin 12 to be rotated in order to adjust the table 13 relative to the body portion 11 of the bracket, and when the proper adjustment has been made the pin 12 may be securely fixed by means of the plate 60.

The operation of the mechanism so far described is as follows: Since the support 26 is secured to the table 13 and the telescopes 27 and 28 are rigidly secured to the support 26, it will be seen that the telescopes will be moved with the table 13. The bracket 10 being secured to the cradle of the gun will have a fixed relation to the latter. Assuming that the telescopes 27 and 28 are, in the position shown in Figs. 1 and 4, parallel with the axis of the gun, it will be seen that by rotating the operating wheel 48 in the direction to move the blocks 14 and 14ᵃ toward the pivot 12, the telescopes will be gradually swung around the pivot 12 and directed downward. As the blocks 14 and 14ᵃ move toward the pivot 12 the range dial will be rotated, and when the mark on the range dial, indicating the range of the target, coincides with the index 52 the gun may be elevated by its elevating mechanism until the telescopes are brought into range with the target. The gun will then be at the proper elevation to hit the target. It will of course be understood that the setting of the range dial and elevating of the gun may be performed simultaneously.

In a practical embodiment of the invention the arrangement of the parts has been made such that for a movement of the block 14ᵃ along the bracket 10 of about two inches the pivot 22, which connects the block 14 with the block 14ᵃ, will be elevated approximately three-eighths of an inch. Therefore the angle through which the table 13 is swung by this movement of the block 13 is measured by the ratio of the height the pin 22 is raised to the distance between the pivot 12 and the new position of the pivot 22. Since this ratio increases very rapidly as the block 14 approaches the pivot 12 it will be seen that when the block 14 has reached the limit of its movement toward the pivot 12 the angle between the table 13 and the bracket 10 will be comparatively large. Furthermore, since the block 14 is nearest the pivot 12 for the long ranges of the gun and farthest from this pivot for short ranges, the movements of the block 14 to effect a given change in angle will be much less for the long ranges than for the short ranges and therefore the spacings on the range dial for the different ranges will be substantially uniform.

Variations in azimuth or deflectional movement of the sight is obtained by moving the support 26 about the vertical pivot 25. In order to effect this movement the table 13 may be provided at its rearward end with a segmental rack 62 which is engaged by the worm 63 which is carried on a shaft 64 mounted in suitable bearings arranged on the support 26. The shaft 64 may be rotated in any preferred manner and for this purpose we have shown the same as being provided with a worm-gear 65 which is arranged in a suitable casing 66 carried by the support 26, and has in engagement therewith a worm 67 which is mounted on a shaft 68, this shaft being provided with an operating wheel 69. Exteriorly of the casing 66 the shaft 64 may be provided with a dial 70, upon which may be marked the deflectional angles. A suitable index 71 may be secured on the block 26 and adapted to register with the marks on the dial 70 for the purpose of reading the latter. An electric lamp 72 may be provided adjacent the index 71 to light the dial and the index at night.

The telescopes are deflected to any desired angle by rotating the operating wheel 69. Owing to the fact that there is a double worm gear reduction between the operating wheel 69 and the segmental rack 62, it will be seen that very minute adjustments may be obtained.

It will be obvious to those skilled in the art that various changes may be made in the minor details of the construction of the mechanism within the scope of the appended claims and therefore we do not wish to be limited to the exact details shown and described.

While we have illustrated and described a gun sight employing the usual magnifying telescope and a dumb telescope or peep sight, it is to be understood that the invention may be used in connection with any other combination of sighting devices, and, in some cases, it may be preferable to use a single telescope having front and rear notch sights which serve the same purpose as the peep sight shown and described.

Having described the invention, what is claimed is:

1. In a gun sight, the combination of a member adapted to be secured to the gun, a second member, a horizontal pivot connecting said members together, a vertically arranged pivot carried by said second member, a third member mounted on said second member and engaging said vertically arranged pivot and having a telescope mounted thereon, means for adjusting said third member relative to the second, a pair of pivotally connected blocks having flanges engaging corresponding grooves in the first and second members whereby said members are securely held against relative movement, said blocks being movable longitudinally of said members to vary the angular relation of the members, a range dial carried by the first member, a rack carried by one of said blocks, and a pinion connected with the range dial and adapted to be actuated by said rack to rotate the dial in accordance with the movements of said blocks.

2. In a gun sight, the combination of a member adapted to be secured to the gun, a second member, a horizontal pivot connecting said members together, a telescope, means connecting said telescope to said second member, a pair of pivotally connected blocks having flanges engaging corresponding grooves in the first and second members, whereby said members are securely held against relative movement, said blocks being movable longitudinally of said members to vary the angular relation of the members, a range dial rotatably mounted on the first member, a rack carried by one of said blocks, and a pinion connected with said dial and engaged by said rack whereby the dial is rotated in accordance with the movements of said blocks.

In testimony whereof we affix our signatures in presence of two witnesses.

ROBERT P. STOUT.
FRANK A. SULLIVAN.

Witnesses:
EDWIN A. MILLER,
FRANK I. GRIM.